United States Patent [19]

Platt et al.

[11] 3,781,828

[45] Dec. 25, 1973

[54] THREE-DIMENSIONALLY ADDRESSED MEMORY

[75] Inventors: Steven Platt, Underhill, Vt.; Jehoshua N. Pomeranz, Suffern, N.Y.

[73] Assignee: International Business Machines Corporation, Armonk, N.Y.

[22] Filed: May 4, 1972

[21] Appl. No.: 250,225

[52] U.S. Cl. . 340/173 R, 340/173 FF, 340/173 PE, 307/238, 307/291, 307/292

[51] Int. Cl. .......... G11c 11/40

[58] Field of Search .......... 340/173 R, 173 FF, 340/173 PE

[56] References Cited

UNITED STATES PATENTS

| | | | |
|---|---|---|---|
| 3,423,737 | 1/1969 | Harper | 340/173 R |
| 3,436,738 | 4/1969 | Martin | 340/173 R |
| 3,618,052 | 11/1971 | Kwei | 340/173 R |

*Primary Examiner*—Terrell W. Fears
*Attorney*—Martin G. Reiffin et al.

[57] ABSTRACT

An array of memory cells is provided with each cell having a word top line, a word bottom line and a pair of bit lines connected thereto. Either a standby voltage or a select voltage is applied to each of the lines, whereby any cell of the array may be selected by applying a select voltage to the two word lines and one or both bit lines connected to the cell. In one of the disclosed embodiments, the cells are arranged in columns and in groups of rows. Each of a plurality of word top drive lines is connected to all of the rows of the cells of a respective group to select any group of rows, each of a plurality of word bottom drive lines is connected to a respective row of cells in each of the groups to select one row of the selected group, and a plurality of pairs of bit lines are provided with each pair connected to the cells of a respective column to select one column and thereby one cell of the selected row. Each cell preferably comprises a cross-coupled pair of transistors each having a collector and first and second emitters. The word top lines are connected to the collector load impedances, the word bottom lines are connected to the first emitters, and the bit lines are connected to the second emitters.

19 Claims, 3 Drawing Figures

THREE-DIMENSIONALLY ADDRESSED MEMORY

BACKGROUND OF THE INVENTION

1. Field of the Invention

This invention relates to memories for storing digital information, such as may be utilized in digital computers and other data processing or data communication equipment. More particularly, the invention relates to a novel improved memory which may be addressed three-dimensionally instead of two-dimensionally as generally prevalent in the prior art.

2. Description of the Prior Art

Memories in accordance with the prior art comprise an array of memory cells arranged in rows and columns, with each cell adapted to store a single binary digit or bit. In order to write information into or read information out of the memory, a single cell is selected by an addressing arrangement comprising a plurality of word lines each connected to all of the cells of a respective row, and a plurality of pairs of bit lines with each pair connected to all the cells of a respective column. A first set of decoder and line driver circuits are provided with each circuit connected to a respective word line, and a second set of decoder switch circuits are provided with each circuit connected to a respective pair of bit lines. One of the decoder and line driver circuits is actuated to energize one of the word lines and thereby select a particular row of cells, and one of the decoder switch circuits is actuated to select a pair of bit lines and thereby select a particular column of cells. The single cell located in the particular row and the particular column is thereby selected and a bit of information may be written into or read out of the selected cell.

It will thus be seen that memories in accordance with the prior art require a decoder circuit for each row and each column of the array. For example, in an array containing 4,096 memory cells arranged in 64 words of rows by 64 bits or columns, there will be required a total of 128 decoder circuits.

The two-dimensionally addressed memories in accordance with the prior art therefore require a large number of decoder circuits. This is highly disadvantageous in several important respects when the memories are embodied in the form of monolithic integrated circuits. First, the large number of decoder circuits take up a substantial amount of the chip area, thereby increasing the cost of manufacture per bit of information. Second, the large number of decoder circuits results in a substantial amount of power dissipation, thereby reducing the speed-power ratio of the memory, In U.S. Pat. No. 3,436,738 issued Apr. 1, 1969 to R. C. Martin, there is disclosed a memory which might be characterized as three-dimensionally-addressed. However, this prior art arrangement also requires a decoder circuit for each row and each column of the arrax, and hence does not obviate the above-noted disadvantages of the two-dimensionally addressed memories of the prior art.

SUMMARY OF THE INVENTION

It is therefore a primary object of the present invention to provide a novel three-dimensionally addressed memory which requires fewer decoder circuits than required by prior art memories. This results in a smaller chip area for a given size memory array, thereby achieving a lower cost of manufacture per bit of information, and also results in lower power dissipation, thereby improving the speed-power ratio of the memory.

For example, assuming a memory array of 4,096 memory cells, in accordance with the present invention the array is decoded three-dimensionally; that is, 16 word top lines by 16 word bottom lines by 16 bit lines, each line requiring a decoder circuit, to make a total of only 48 decoder circuits as compared with a total of 128 decoder circuits required by memories in accordance with the prior art.

This object is achieved by a noevel arrangement whereby the memory cells are arrayed in a plurality of vertical columns and a plurality of horizontal groups each including a plurality of horizontal rows. A plurality of pairs of bit lines are provided with each pair connected to the cells of a respective column. Each of a first set of word lines is connected to all of the rows of cells of a respective group, and each of a second set of word lines is connected to a respective row of cells of each of the groups. Thus, a pair of bit lines may be energized to select a particular column, one of the first set of word lines may be energized to select the rows of a particular group, and one of the second set of word lines may be energized to select a particular row within the particular group.

Each memory cell preferably comprises a pair of transistors each having a collector, a base, and first and second emitters, cross-coupling means connecting the base of each transistor to the collector of the other transistor, and a pair of load impedances each connected to a respective collector. The bit lines are connected to the second emitters. In one disclosed embodiment, the first set of word lines are connected to the load impedances, and the second set of word lines are connected to the first emitters. In a second disclosed embodiment, the first set of word lines are connected to the first emitters, and the second set of word lines are connected to the load impedances.

DESCRIPTION OF THE PREFERRED EMBODIMENTS

MEMORY CELL CIRCUIT

Figure 1:
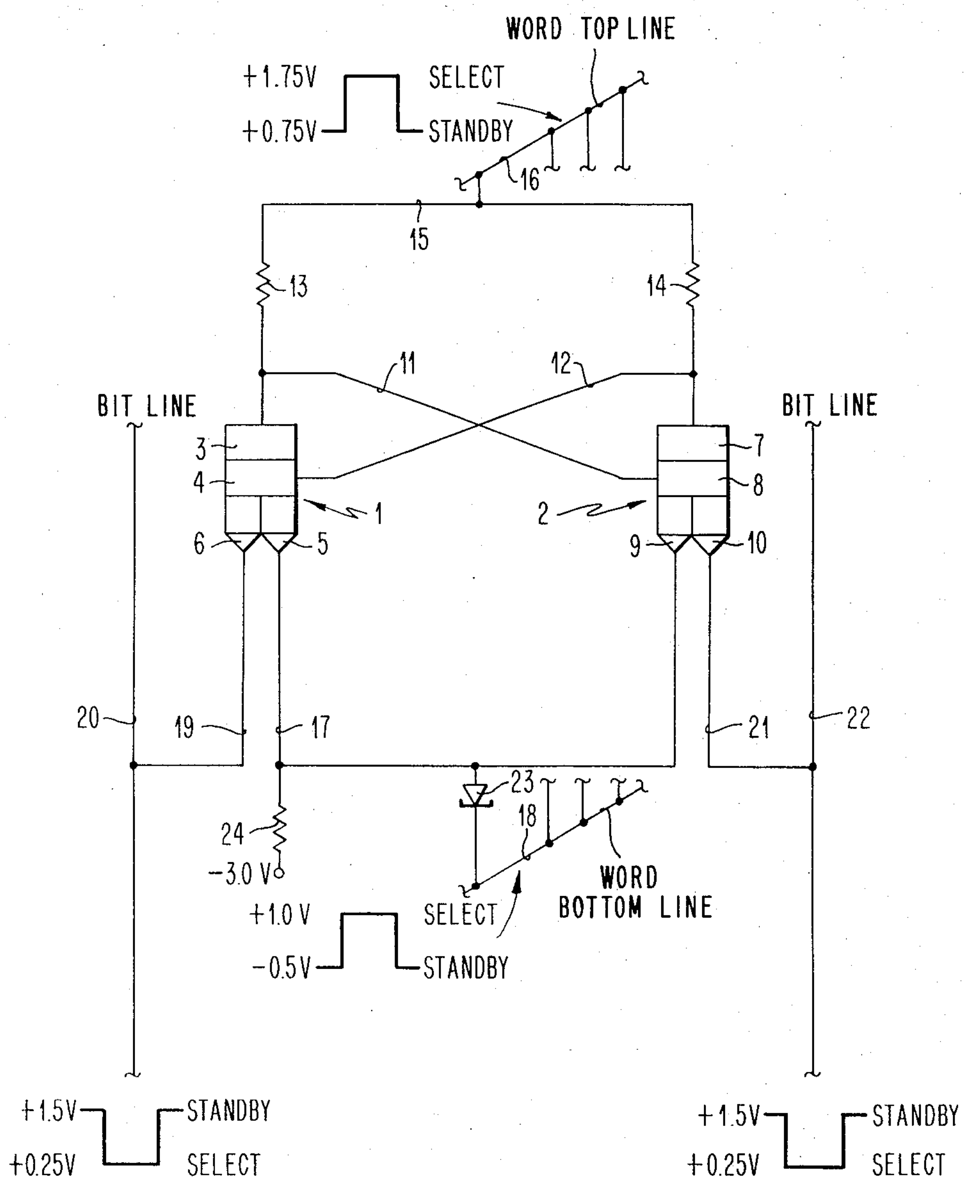
FIG. 1 is a schematic circuit diagram showing a single memory cell in accordance with the present invention, and the word top line, word bottom line, and bit lines connected thereto.

Referring first to FIG. 1 which shows a schematic circuit diagram of a memory cell in accordance with the present invention, there are provided a pair of transistors 1, 2 in a cross-coupled arrangement to form a bistable circuit adapted to store a single bit of information. More specifically, transistor 1 comprises a collector 3, a base 4, a first emitter 5, and a second emitter 6. Transistor 2 comprises a collector 7, a base 8, a first emitter 9, and a second emitter 10. Collector 3 of transistor 1 is connected by lead 11 to base 8 of transistor 2, and collector 7 of transistor 2 is connected by lead 12 to base 4 of transistor 1.

Collector 3 of transistor 1 is connected to the lower end of a load resistor 13, and collector 7 of transistor 2 is connected to the lower end of a load resistor 14. The upper ends of load resistors 13, 14 are connected by a lead 15 in turn connected to a word top line 16. It will be understood that the other cells of the row are similarly connected to the same word top line 16.

First emitter 5 of transistor 1 and first emitter 9 of transistor 2 are interconnected by a lead 17 in turn connected to the anode of a Schottky diode 23 having its cathode connected to a word bottom line 18. It will be understood that the other memory cells of the row are similarly connected to the same word bottom line 18. Second emitter 6 of transistor 1 is connected by a lead 19 to a first bit line 20, and second emitter 10 of transistor 2 is connected by a lead 21 to a second bit line 22. It will be understood that all of the memory cells of a column are similarly connected to the same pair of bit lines 20, 22. Lead 17 is also connected through a resistor 24 to a voltage source V at a potential of −3 volts. Resistor 24 may be about 30K ohms and load resistors 13, 14 may be about 7.5K ohms.

MEMORY CELL OPERATION

The operation of the cell shown in FIG. 1 will now be described. During standby, that is, when the cell is neither fully nor partially selected, word top line 16 is at a lower potential of +0.75 volt, word bottom line 18 is at a lower potential of −0.50 volt, and bit lines 20, 22 are at an upper potential of +1.50 volts. To fully select the cell, word top line 16 is raised to an upper potential of +1.75 volts, word bottom line 18 is raised to an upper potential of +1.00 volt and one or both of bit lines 20, 22 is lowered to a potential of +0.25 volt, depending upon whether a read or write operation is to be performed.

If transistor 1 is conductive, collector current flows through load resistor 13 so as to provide a voltage drop across the latter and thereby maintain collector 3 at a relatively lower potential level. This lower potential level is transmitted by lead 11 to base 8 of transistor 2 thereby maintaining the latter cut off. Since transistor 2 is cut off, there is no collector current flowing downwardly through load resistor 14 and hence there is only a relatively small voltage drop across the latter due to the base current flowing into base 4 of transistor 1. Therefore, collector 7 of transistor 2 is at a relatively higher potential level which is transmitted by lead 12 to base 4 of transistor 1, thereby maintaining the latter conductive. Since the circuit is symmetrical, it will be seen that if transistor 2 is conductive, then transistor 1 will be maintained cut off.

The read operation will now be described. Assume that transistor 1 is conductive and that transistor 2 is cut off. The potential of word top line 16 is raised to +1.75 volts and the potential of word bottom line 18 is raised to +1.00 volt. The potential of both bit lines 20, 22 is lowered to +0.25 volt. Emitter 6 is therefore at a lower potential of +0.25 volt than emitter 5 which rises to about +1.00 volt, and the current formerly flowing through emitter 5 switches to emitter 6 from whence it flows through lead 19 and bit line 20 to a sense amplifier where it is sensed in the usual manner to determine that transistor 1 is conductive. Similarly, if transistor 2 is conductive, then the current switches from emitter 9 to emitter 10 and bit line 22 for sensing by the sense amplifier.

The write operation will now be described. Assume that transistor 1 is conductive and that it is desired to switch the stste of the cell so that transistor 1 is cut off and transistor 2 is conductive. The potential of word top line 16 is raised to +1.75 volts and the potential of word bottom line 18 is raised to +1.00 volt. The potential of bit line 20 is maintained at the standby voltage of +1.50 volts, whereas the potential of bit line 22 is lowered to +0.25 volt. Both emitters 5, 6 of transistor 1 are therefore at a relatively high potential level tending to cut off transistor 1. The reduced flow of collector current through load resistor 13 therefore reduces the voltage drop across the latter and the potential of collector 3 tends to rise. This rising potential is transmitted by lead 11 to base 8 of transistor 2. This, together with the relatively lower potential level of emitter 10 applied thereto by bit line 22 tends to render transistor 2 conductive, thereby causing a current to flow through load resistor 14 and generating a voltage drop across the latter. This lowers the potential of collector 7 and this lowered potential is transmitted by lead 12 to base 4 of transistor 1 thereby further tending to cut off the latter. This action is regenerative and the state of the cell is quickly switched with transistor 2 rendered fully conductive and the current therethrough flows through emitter 10. Upon return of the potential of bit line 22 to the standby voltage of +1.50 volts and the return of the potential of word bottom line 18 to the standby voltage of −0.50 volt, emitter 9 is at a lower potential than emitter 10 and the current flowing through emitter 10 switches to emitter 9.

Resistor 24 and voltage source V maintain the "on" transistor 1 or 2 conductive, and thereby prevent the loss of the stored information, when the cell is only partially selected by raising the potential of word bottom line 18 to the "select" level of +1.00 volt while maintaining the potential of word top line 16 at the "standby" level of 0.75 volt. In this event, the potential of emitters 5, 9 rises to about ground level while the potential of base 4 or 8 of the "on" transistor 1 or 2 is about +0.75 volt, thereby maintaining the "on" transistor 1 or 2 conductive. Without resistor 24 and voltage source V the potential of emitters 5, 9 would rise sufficiently high to cut off the "on" transistor 1 or 2 and the cell would then no longer retain the stored information.

Diode 23 prevents the transmission of current to bit line 20 or 22 when the cell is only partially selected by raising the potential of word top line 16 to the "select" level of +1.75 volts while maintaining the potential of word bottom line 18 at the "standby" level of −0.50 volt. In this event, the potential of emitters 5, 9 is clamped by diode 23 at about ground level below the potential of emitters 6, 10 and therefore no current can flow through the latter to bit lines 20, 22.

MEMORY ARRAY — FIRST EMBODIMENT

Figure 2:
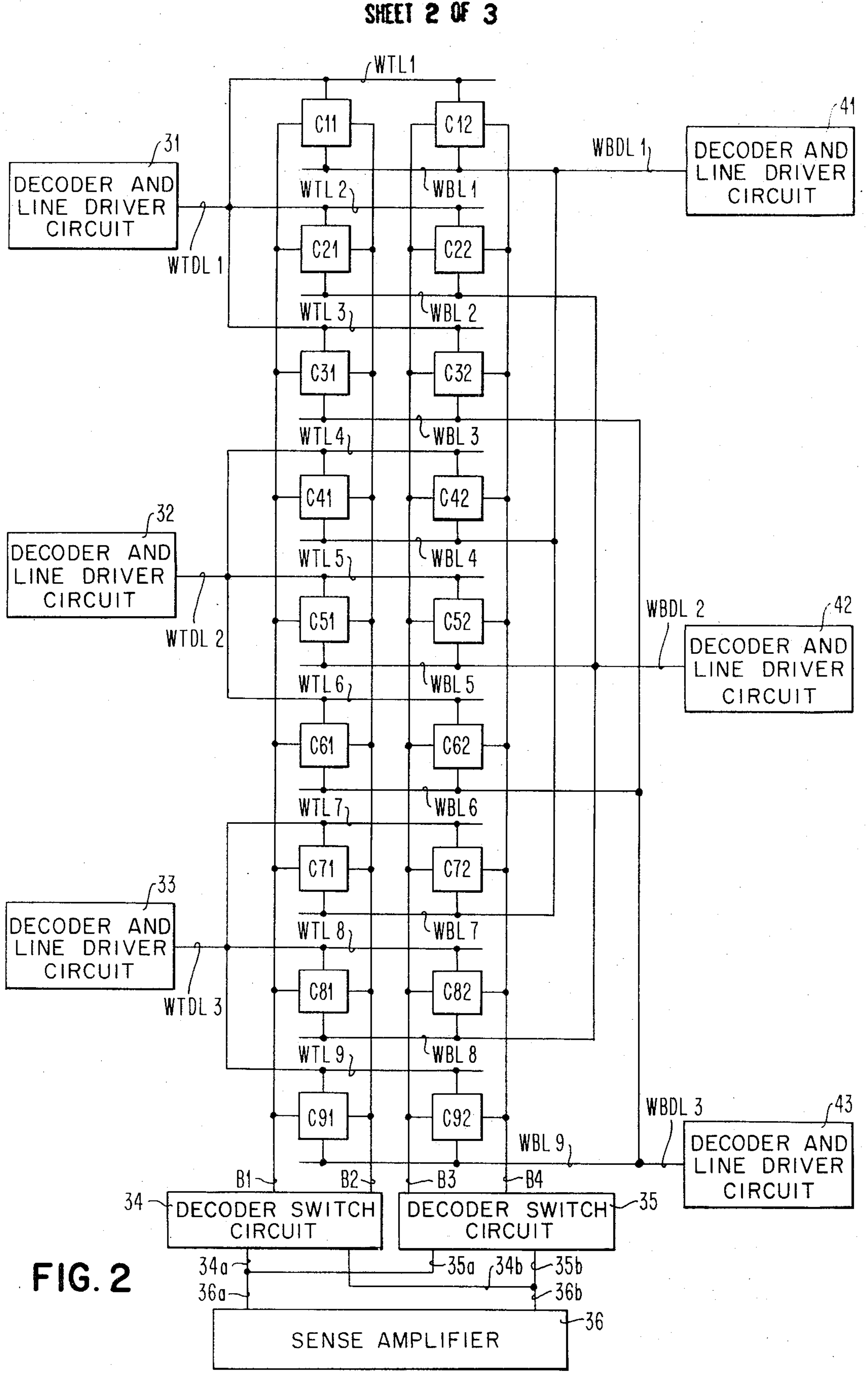
FIG. 2 is a schematic block diagram showing an array of memory cells and decoder circuits connected thereto in accordance with one embodiment of the invention.

Referring now to FIG. 2, there is shown an array of memory cells and addressing arrangement in accordance with a first embodiment of the invention. The cells are arranged in two vertical columns and three horizontal groups each having three rows. It will be understood that in actual practice the array will comprise many more columns, groups and rows which have not been shown in the drawing in order to obtain clarity of illustration and ease of description. The first column of nine cells are designated C11 to C91 respectively, and the second column of nine cells are designated C12 to C92 respectively. The first group of rows comprises a first row of cells C11, C12, a second row of cells C21, C22, and a third row of cells C31, C32. The second group of rows comprises a first row of cells C41, C42, a second row of cells C51, C52, and a third row of cells C61, C62. The third group of rows comprises a first row of cells C71, C72, a second row of cells C81, C82, and a third row of cells C91, C92.

The cells of each row are connected to a respective word top line designated WTL1 to WTL9, and to a respective word bottom line WBL1 to WBL9, in the manner shown in FIG. 1. The three word top lines WTL1, WTL2, WTL3 of the first group are connected to a word top drive line WTDL1. The three word top lines WTL4, WTL5, WTL6 of the second group are connected to a second word top drive line WTDL2. The three word top lines WTL7, WTL8, WTL9 of the third group are connected to a third word top drive line WTDL3. The first word top drive line WTDL1 is connected to a first decoder and line driver circuit 31; the second word top drive line WTDL2 is connected to a second decoder and line driver circuit 32; and the third word top drive line WTDL3 is connected to a third decoder and line driver circuit 33.

The word bottom lines WBL1, WBL4, WBL7 of the first row of each group are connected to a first word bottom drive line WBDL1. the word bottom lines WBL2, WBL5, WBL8 of the second row of each group are connected to a second word bottom drive line WBDL2. The word bottom lines WBL3, WBL6, WBL9 of the third row of each group are connected to a third word bottom drive line WBDL3. Word bottom drive line WBDL1 is connected to a first decoder and line driver circuit 41; word bottom drive line WBDL2 is connected to a second decoder and line driver circuit 42; and word bottom drive line WBDL3 is connected to a third decoder and line driver circuit 43.

A first pair of bit lines B1, B2 are connected to cells C11 to C91 of the first column. A second pair of bit lines B3, B4 are connected to cells C12 to C92 of the second column. Bit lines B1, B2 are connected to a first decoder switch circuit 34. Bit lines B3, B4 are connected to a second decoder switch circuit 35. Output 34a of decoder switch circuit 34 and output 35*a* of decoder switch circuit 35 are connected to a first input 36*a* of a sense amplifier 36. Output 34*b* of decoder switch circuit 34 and output 35*b* of decoder switch circuit 35 are connected to a second input 36*b* of sense amplifier 36.

Decoder and line driver circuits 31, 32, 33, 41, 42, 43, decoder switch circuits 34, 35 and sense amplifier 36 may be conventional circuit types well known in the art and the details thereof are not disclosed because they are not material to the present invention.

In order to address a single cell of the array for writing into or reading out of the selected cell, the cell must be selected with respect to all three dimensions. A single one of the decoder and line driver circuits 31, 32, 33 is actuated to raise the potential of one of the three word top drive lines WTDL1, WTDL2, WTDL3, and thereby the three word top lines connected thereto, to the upper select voltage level, thereby selecting one of the three groups of rows. For example, if decoder and line driver circuit 31 is actuated, word top drive line WTDL1 and the three word top lines WTL1, WTL2, WTL3 of the first group are raised to the select voltage level. One of the three decoder and line driver circuits 41, 42, 43 is also actuated to raise the potential of one of the three word bottom drive lines WBDL1, WBDL2, WBDL3, and the three word bottom lines connected thereto, to the select voltage level. For example, if decoder and line driver circuit 41 is actuated, the potential of word bottom drive line WBDL1 and word bottom lines WBL1, WBL4, WBL7 connected thereto, is raised to the select voltage level, whereby selecting first row of each group of cells. One of the two decoder switch circuits 34, 35 is actuated to lower the potential of one or both bit lines of either the pair of B1, B2 or the pair B3, B4, thereby selecting either the first column of cells C11 to C91 or the second column of cells C12 to C92. For example, if a read operation is to be performed with respect to cell C11, decoder switch circuit 34 is actuated to lower the potential of both bit lines B1, B2 to the select voltage level.

MEMORY ARRAY — SECOND EMBODIMENT

Figure 3:
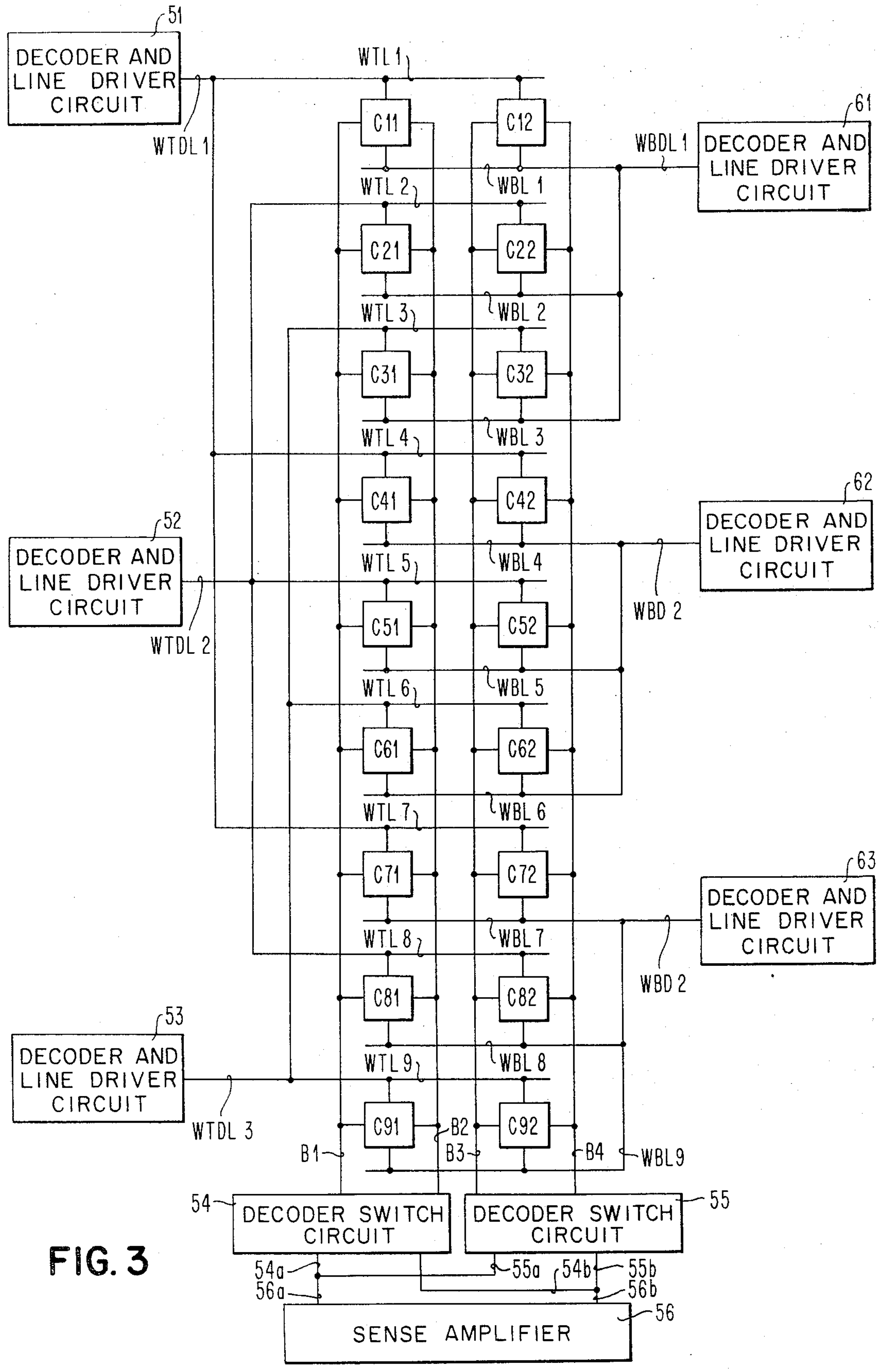
FIG. 3 is a schematic block diagram showing an array of memory cells and decoder circuits connected thereto in accordance with an alternative embodiment of the invention.

Referring now to FIG. 3, there is disclosed an array of memory cells and an addressing arrangement in accordance with a second embodiment of the invention. This embodiment is similar to the first embodiment described above with respect to FIG. 2 except that in FIG. 3, each word top drive line is connected to a respective row of cells in each of the groups, and each word bottom drive line is connected to all of the rows of cells in a respective group.

More specifically, the array of FIG. 3 comprises a first column of nine cells C11 to C91 and a second column of nine cells C12 to C92 arranged in three groups each having three horizontal rows. Each row is connected to a respective word top line WTL1 to WTL9 and a respective word bottom line WBL1 to WBL9, in the manner described above with respect to FIG. 1. Word top lines WTL1, WTL4, WTL7 of the first row of each group are connected to a first word top drive line WTDL1. Word top lines WTL2, WTL5, WTL8 of the second row of each group are connected to a second word top drive line WTDL2. Word top lines WTL3, WTL6, WTL9 of the third row of each group are connected to a third word top drive line WTDL3. Word top drive line WTDL1 is connected to a first decoder and line driver circuit 51. Word top drive line WTDL2 is connected to a second decoder and line driver circuit 52. Word top drive line WTDL3 is connected to a third decoder and line driver circuit 53.

The three word bottom lines WBL1, WBL2, WBL3 of the first group are connected to a first word bottom drive line WBDL1. The three word bottom lines WBL4, WBL5, WBL6 of the second group are connected to a second word bottom drive line WBDL2. The three word bottom lines WBL7, WBL8, WBL9 of the third group are connected to a third word bottom drive line WBDL3. Word bottom drive line WBDL1 is connected to a decoder and line driver circuit 61. Word bottom drive line WBDL2 is connected to a decoder and line driver circuit 62. Word bottom drive line WBDL3 is connected to a decoder and line driver circuit 63.

The first pair of bit lines B1, B2 are connected to a first decoder switch circuit 54; and the second pair of bit lines B3, B4 are connected to a second decoder switch circuit 55. Output 54*a* of decoder switch circuit 54 and output 55*a* of decoder switch circuit 55 are connected to a first input *56a* of a sense amplifier 56; and output *54b* of decoder switch circuit 54 and output *55b* of decoder switch circuit 55 are connected to a second input *56b* of sense amplifier 56.

In order to address a single cell of the array for a read or write operation, one of the three decoder and line driver circuits 61, 62, 63 is actuated to select one of the three groups of rows; one of the three decoder and line driver circuits 51, 52, 53 is actuated to select a particular row of selected group; and one of the two decoder switch circuits 54, 55 is actuated to select one of the columns. For example, if decoder and line driver circuits 51, 61 and decoder switch circuit 54 are actuated, then the first row of the first group and the first column are addressed so as to select cell C11.

It is to be understood that the specific embodiments shown in the drawing and described above are merely illustrative of two of the many forms which the invention may take in practice and that numerous modifications and variations thereof will readily occur to those skilled in the art without departing from the scope of the invention as defined by the claims, and that the claims are to be construed as broadly as permitted by the prior art.

We claim:

1. A memory cell comprising
- a pair of transistors each having a collector, a base, and first and second emitters,
- cross-coupling means connecting the base of each transistor to the collector of the other transistor,
- a pair of load impedances each connected to a respective collector, first addressing means connected to said load impedances, second addressing means connected to said first emitters, and third addressing means connected to said second emitters.

2. A memory cell as recited in claim 1 wherein
- said first addressing means comprises a word top line,
- said second addressing means comprises a word bottom line, and
- said third addressing means comprises a pair of bit lines each connected to a respective one of said second emitters.

3. A memory cell as recited in claim 2 and comprising
- a first decoder circuit and line driver connected to said word top line,
- a second decoder circuit and line driver connected to said word bottom line, and
- a decoder switch and sense amplifier connected to said bit lines.

4. A three-dimensionally addressed memory comprising
- an array of memory cells arranged in a plurality of vertical columns and a plurality of horizontal groups each including a plurality of horizontal rows,
- a plurality of pairs of bit lines with each pair connected to the cells of a respective column,
- a first plurality of word lines each connected to all of the rows of cells of a respective group, and
- a second plurality of word lines each connected to a respective row of cells of each of the groups.

5. A memory as recited in claim 4 and comprising
- a plurality of decoder switches each connected to a respective pair of bit lines,
- a sense amplifier connected to said decoder switches,
- a first plurality of decoder and line driver circuits each connected to a respective one of said first plurality of word lines, and
- a second plurality of decoder and line driver circuits each connected to a respective one of said second plurality of word lines.

6. A memory as recited in claim 4 wherein each of said cells comprises
- a pair of transistors each having a collector, a base, and first and second emitters,
- cross-coupling means connecting the base of each transistor to the collector of the other transistor, and
- a pair of load impedances each connected to a respective collector,
- one of said first plurality of word lines being connected to said load impedances,
- the respective pair of bit lines being connected to said first emitters, and
- one of said second plurality of word lines being connected to said second emitters.

7. A memory as recited in claim 6 and comprising
- a plurality of decoder switches each connected to a respective pair of bit lines,
- a sense amplifier connected to said decoder switches,
- a first plurality of decoder and line driver circuits each connected to a respective one of said first plurality of word lines, and
- a second plurality of decoder and line driver circuits each connected to a respective one of said second plurality of word lines.

8. A memory comprising
- an array of memory cells arranged in a plurality of vertical columns and a plurality of horizontal groups each including a plurality of horizontal rows,
- first addressing means for partially selecting the cells of a selected group,
- second addressing means for partially selecting the cells of a selected column, and
- third addressing means for partially selecting the cells of a selected row of the selected group,
- each of said cells comprising a pair of transistors each having a collector, a base, and first and second emitters,
- cross-coupling means connecting the base of each transistor to the collector of the other transistor, and
- a pair of load impedances each connected to a respective collector,
- said first addressing means being connected to said load impedances,
- said second addressing means being connected to said first emitters, and
- said third addressing means being connected to said second emitters.

9. A memory comprising
- an array of memory cells arranged in a plurality of vertical columns and a plurality of horizontal groups each including a plurality of horizontal rows,
- first addressing means for partially selecting the cells of a selected group,
- second addressing means for partially selecting the cells of a selected column, and
- third addressing means for partially selecting the cells of a selected row of the selected group, each of said cells comprising a pair of transistors each having a collector, a base, and first and second emitters,
cross-coupling means connecting the base of each transistor to the collector of the other transistor, and
a pair of load impedances each connected to a respective collector,
said third addressing means being connected to said load impedances,
said second addressing means being connected to said first emitters, and said first addressing means being connected to said second emitters.

10. A memory as recited in claim 11 wherein
said cells are arranged in columns and in groups of rows,
a plurality of said first lines each connected to all of the rows of cells of a respective group,
a plurality of said second lines each connected to a respective row of cells in each of the groups, and
a plurality of said third lines each connected to the cells of a respective column.

11. A memory comprising
an array of memory cells,
each cell having at least first, second and third lines connected thereto,
means for applying either a standby voltage or a select voltage to each of said three lines,
whereby any cell of the array may be selected by applying a select voltage to all three lines connected to said cell,
said cells are arranged in columns and in groups of rows,
a plurality of said first lines each connected to all of the rows of cells of a respective group,
a plurality of said second lines each connected to a respective row of cells in each of the groups,
a plurality of said third lines each connected to the cells of a respective column,
each of said cells comprising a transistor having a collector and first and second emitters,
said first lines being connected to the collectors of the respective cells,
said second lines being connected to the first emitters of the respective cells, and
said third lines being connected to the second emitters of the respective cell.

12. A memory comprising
an array of memory cells,
each cell having at least first, second and third lines connected thereto,
means for applying either a standby voltage or a select voltage to each of said three lines,
whereby any cell of the array may be selected by applying a select voltage to all three lines connected to said cell,
said cells are arranged in columns and in groups of rows,
a plurality of said first lines each connected to all of the rows of cells of a respective group,
a plurality of said second lines each connected to a respective row of cells in each of the groups,
a plurality of said third lines each connected to the cells of a respective column,
each of said cells comprising a transistor having a collector and first and second emitters,
said second lines being connected to the collectors of the respective cells,
said first lines being connected to the first emitters of the respective cells, and
said third lines being connected to the second emitters of the respective cells.

13. A three-dimensionally addressed memory comprising
an array of memory cells arranged in columns and in groups each including a plurality of rows,
a plurality of word top lines each connected to the cells of a respective row,
a plurality of word bottom lines each connected to the cells of a respective row,
a plurality of bit lines each connected to the cells of a respective column,
a plurality of word top drive lines each connected to those word top lines connected to the cells of all of the rows of a respective group, and
a plurality of word bottom drive lines each connected to those word bottom lines connected to a respective row of cells in each of the groups.

14. A memory as recited in claim 13 and comprising
a first plurality of decoder and line driver circuits each connected to a respective word top drive line,
a second plurality of decoder and line driver circuits each connected to a respective word bottom drive line,
a plurality of decoder switch circuits each connected to a respective bit line, and
a sense amplifier connected to said decoder switch circuits.

15. A three-dimensionally addressed memory comprising
an array of memory cells arranged in columns and in groups each including a plurality of rows,
a plurality of word top lines each connected to the cells of a respective row,
a plurality of word bottom lines each connected to the cells of a respective row,
a plurality of bit lines each connected to the cells of a respective column,
a plurality of word top drive lines each connected to those word top lines connected to a respective row of cells in each of the groups, and
a plurality of word drive lines each connected to those word bottom lines connected to the cells of all of the rows of a respective group.

16. A memory as recited in claim 15 and comprising
a first plurality of decoder and line driver circuits each connected to a respective word top drive line,
a second plurality of decoder and line driver circuits each connected to a respective word bottom drive line,
a plurality of decoder switch circuits each connected to a respective bit line, and
a sense amplifier connected to said decoder switch circuits.

17. A memory cell comprising
a pair of transistors each having a collector, a base, and first and second emitters,
cross-coupling means connecting the base of each transistor to the collector of the other transistor,
a pair of load impedances each connected to a respective collector,
a word top line connected to said load impedances, a pair of bit lines connected respectively to said second emitters,
a diode connected to said first emitters,
a word bottom line connected to said diode,
a resistor connected to said second emitters,
a voltage source connected to said resistor,
means for selectively applying either a select voltage or a standby voltage to said word top line,
means for selectively applying either a select voltage or a standby voltage to said word bottom line, and
means for selectively applying either a select voltage or a standby voltage to said bit lines.

18. A three-dimensionally addressed memory comprising an array of memory cells each as recited in claim 11,
said array of memory cells being arranged in a plurality of columns and a plurality of groups each including a plurality of rows,
each of the word top lines being in common with and connected to all the cells of a respective row,
each of the word bottom lines being in common with and connected to all the cells of a respective row,
each of the pairs of bit lines being in common with and connected to all the cells of a respective column,
a plurality of word top drive lines each connected to all of the word top lines connected to all of the rows of cells of a respective group,
a plurality of word bottom drive lines each connected to the word bottom lines connected to a respective row of cells of each of the groups,
a first plurality of line driver circuits each connected to a respective word top drive line, and
a second plurality of line driver circuits each connected to a respective word bottom drive line.

19. A three-dimensionally addressed memory comprising an array of memory cells each as recited in claim 17,
said array of memory cells being arranged in a plurality of columns and a plurality of groups each including a plurality of rows,
each of the word top lines being in common with and connected to all the cells of a respective row,
each of the word bottom lines being in common with and connected to all the cells of a respective rows,
each of the pairs of bit lines being in common with and connected to all the cells of a respective column,
a plurality of word bottom drive lines each connected to all of the word bottom lines connected to all of the rows of cells of a respective group,
a plurality of word top drive lines each connected to the word top lines connected to a respective row of cells of each of the groups,
a first plurality of line driver circuits each connected to a respective word top drive line, and
a second plurality of line driver circuits each connected to a respective word bottom drive line.

* * * * *